(12) United States Patent
Haskin et al.

(10) Patent No.: US 9,089,059 B1
(45) Date of Patent: Jul. 21, 2015

(54) DEVICE PACKAGING SYSTEM

(71) Applicant: Amazon Technologies, Inc., Reno, NV (US)

(72) Inventors: Menashe Haskin, Palo Alto, CA (US); John Kelly Cornell, Campbell, CA (US); Paul Grady Russell, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/031,957

(22) Filed: Sep. 19, 2013

(51) Int. Cl.
*H05K 5/02* (2006.01)

(52) U.S. Cl.
CPC .................................. *H05K 5/0247* (2013.01)

(58) Field of Classification Search
CPC ............................ H05K 5/0247; G06F 1/1632
USPC .............. 206/320, 723; 381/60, 61, 312, 314, 381/322–324; 702/103, 104, 116; 710/1, 2, 710/74; 713/1, 2, 100
See application file for complete search history.

(56) References Cited

U.S. PATENT DOCUMENTS

| | | | | |
|---|---|---|---|---|
| 6,648,661 B1 * | 11/2003 | Byrne et al. | ................... | 439/188 |
| 7,003,128 B2 * | 2/2006 | Boonen | ................... | 381/322 |
| 7,328,333 B2 * | 2/2008 | Kawano et al. | ................... | 713/1 |
| 8,092,251 B2 * | 1/2012 | Rosenblatt | ................... | 439/536 |
| 8,376,776 B2 | 2/2013 | Rosenblatt | | |
| 8,762,704 B2 * | 6/2014 | Rothkopf et al. | ................... | 713/1 |
| 2005/0243522 A1 | 11/2005 | Nilsen et al. | | |
| 2010/0218465 A1 | 9/2010 | Takaya | | |
| 2011/0061933 A1 | 3/2011 | Prest | | |
| 2012/0279877 A1 | 11/2012 | Janis et al. | | |
| 2013/0086373 A1 | 4/2013 | Rothkopf et al. | | |

FOREIGN PATENT DOCUMENTS

EP          1266834 A1 * 12/2002
WO    WO2008152356      12/2008

* cited by examiner

*Primary Examiner* — Bryon Gehman
(74) *Attorney, Agent, or Firm* — K&L Gates LLP

(57) ABSTRACT

A method of servicing a portable computing device that is sealed in packaging, in which an umbilical adapter connects a servicing interface on the device, such as a micro USB port, with a servicing station dock via externally exposed contacts. The packaged device may be serviced at one or more locations after final assembly to recharge the device's battery, update or install software, or, for mobile phones, provision the mobile phone to access a cellular network.

24 Claims, 14 Drawing Sheets

DEVICE PACKAGING SYSTEM

BACKGROUND

Electronic devices, such as mobile computing devices, including tablets and smartphones, are typically encased in packaging at the place of manufacture or final assembly. Such packaging protects the devices during transportation and storage, while at the same time provides an attractive appearance to a consumer. However, consumer packaging is typically sealed, resulting in the electronic device being inaccessible from the time of packaging until the package is opened by the purchaser. As a result, the manufacturer is unable to access the sealed device once packaging has occurred. In some cases, it may be desirable to access the electronic device after packaging but before delivery to the customer.

Accordingly, there is a need to provide improved servicing capability for packaged electronic devices.

DETAILED DESCRIPTION

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In accordance with various embodiments of the present disclosure, packages with simple and low-cost communication interfaces are provided that do not detract from the durability and appearance of consumer packaging. These packages may utilize an umbilical adapter connection, such as a cable, to communicatively couple the packaged device's servicing interface with an external computing device, such that the packaged device may be powered and/or provisioned without removing the device from the packaging, i.e., while the device is disposed in the unopened package. The packaged device's servicing interface could be any type of physical electronic interface with the device that provides power and/or data transfer to and from the device, e.g., an industry standard port such as a USB or micro USB port, as is commonly used with many mobile phones and other electronic devices to provide both power and data communications. A device servicing station may further provide a platform for communicatively connecting to devices contained in sealed packages of various sizes via a connection region on the exterior of the package, enabling operations on the device as described herein, as will be described in greater detail below. An embodiment of the packaging system may allow a manufacturer to cost-effectively combine the manufacturing and packaging processes of a device before the software of a device is finalized or completed.

Figure 1:
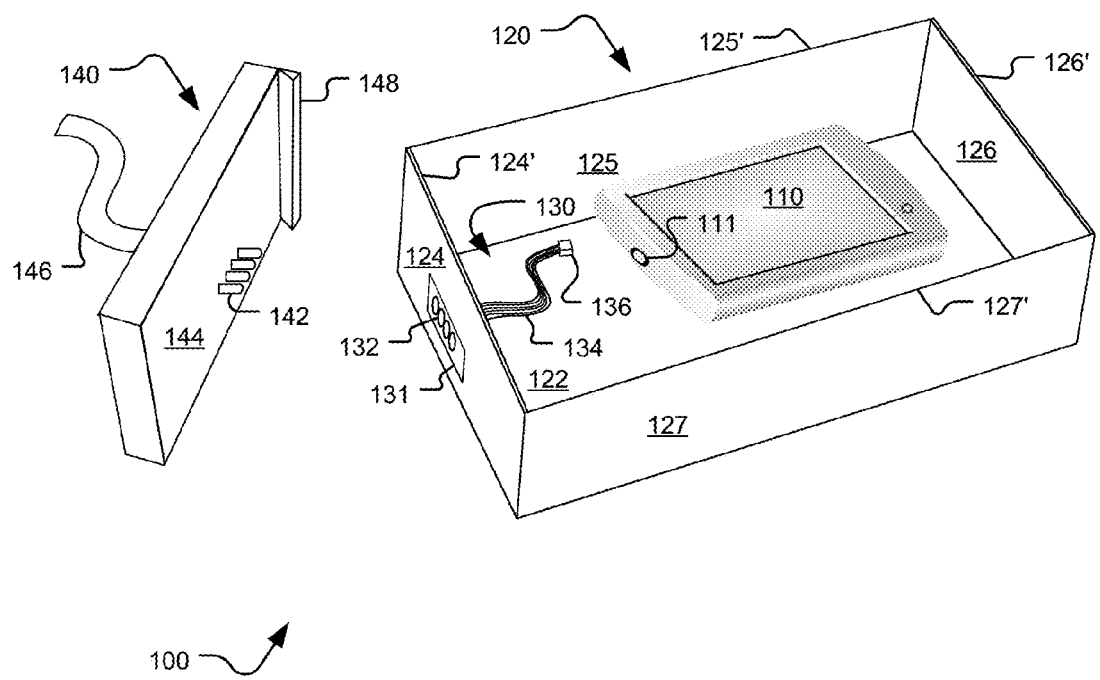
FIG. 1 illustrates a perspective view of an example packaging system in accordance with embodiments of the present invention.
Figure 2:
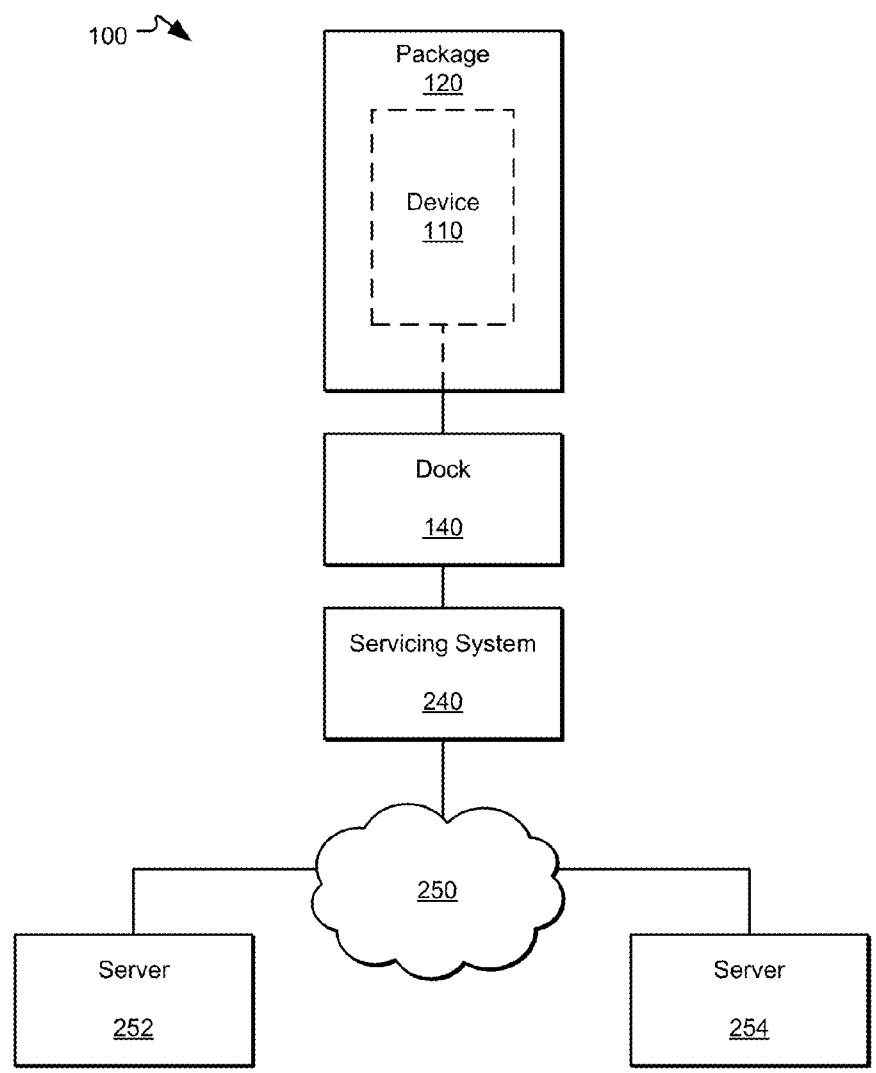
FIG. 2 is a block diagram of an exemplary environment in which embodiments of the packaging system may be used.

FIG. 1 illustrates a perspective view of an example packaging system in accordance with embodiments of the present invention. FIG. 2 is a block diagram illustrating an exemplary environment in which embodiments of the packaging system 100 may be used. In this environment, an electronic device 110 may be sealed in a package 120, such as a box, a container, a bag, a carton and the like. Cushioning materials may be included within the package 120. The electronic device 110 may be a computing device. Computing devices can include smartphones, electronic book readers, tablet computers, notebook computers, personal data assistants, cellular phones, video gaming consoles or controllers, television set top boxes and portable media players, among others. In some embodiments, the electronic device 110 includes a rechargeable battery, a data storage device, and a data communications interface. It should be understood that the device 110 may be any type of device that is capable of interfacing with another device outside of the package, as described in greater detail in accordance with various embodiments discussed herein.

The package 120 may enclose the device 110 and protect the device 110 for transportation, distribution, storage, display, sale and use. The exterior of the package 120 may include written and graphic information about the device 110, enabling the package 120 to have a marketing function in addition to a protective function. The package 120 may be comprised of any combination of materials that preserves the device 110 including fiberboard, cardboard, plastic, metal, and the like. The materials may be corrugated or compressible, and the package 120 may offer increased protection through multiple layers of materials, for example folding corrugated fiberboard to achieve a double wall. The package 120 may fully enclose the device 110, such that the package 120 must be opened in order to remove the device 110 from the package. Opening the package 120 may mar or damage the package 120, for example, when the package 120 is tamper-resistant, the seals of the package 120 are pilfer-indicating, or the package 120 comprises a pull tab coupled to a tear strip.

As discussed herein, the device 110 may include a communication port 111 for coupling with an umbilical connection with the package 120. Such an umbilical connection may comprise, for example, an adapter 130 having an umbilical portion 134 comprising one or more leads for providing electrical coupling between the device 110 and a connection region 131 on the package. Notwithstanding the device 110 being sealed within the package 120, the umbilical connection may allow the device 110 to be serviced without removing the device 110 from the package 120. Servicing a device may include, for example, charging a device's battery, installing software onto the device, updating preinstalled software of the device, patching software of the device, configuring the device, customizing the device, personalizing the device, adding content to the device, and provisioning the device to access network services, such as a cellular phone network. Servicing a device may further include determining a device's status, such as to determine whether a battery needs to be recharged, whether software needs to be upgraded, or whether the device is functioning properly.

As discussed herein, the sealed device 110 may be serviced by connecting the package 120 with the servicing dock 140, which may provide a connection to servicing system 240, which can be a computing device such as a desktop computer. The dock 140 may connect to a connection region 131 of the package 120. The dock 140 may receive the package 120 and facilitate electronic communication between the servicing system 240 and the sealed device 110. Alternatively, the servicing system 240 is not configured for data communications with the device 110, and instead provides electrical power to the device 110 via the dock 140 in order, for example, to charge or recharge the device's battery.

The servicing system 240 may include a processor, a memory, a communications interface, and a user interface for receiving user input. The servicing system 240 may run any of a variety of operating systems, such as Microsoft Windows operating system, the Mac OS by Apple, Inc., or a UNIX-based or LINUX-based operating system. The servicing system 240 may also run software in order to service the device 110.

The servicing system 240 may access a network 250 that may be a local area network or a wide area network, such as the Internet. The servicing system 240 may access the network via an access point, such as a wired or wireless router. The servicing system 240 may be used to access various servers 252, 254 via the network 250. The network 250 may comprise multiple communication networks working in conjunction with multiple servers. The server 252 may, for example, be a media server that provides content for the device 110. The server 254 may, for example, be a file server that provides software for the device 110.

Figure 3:
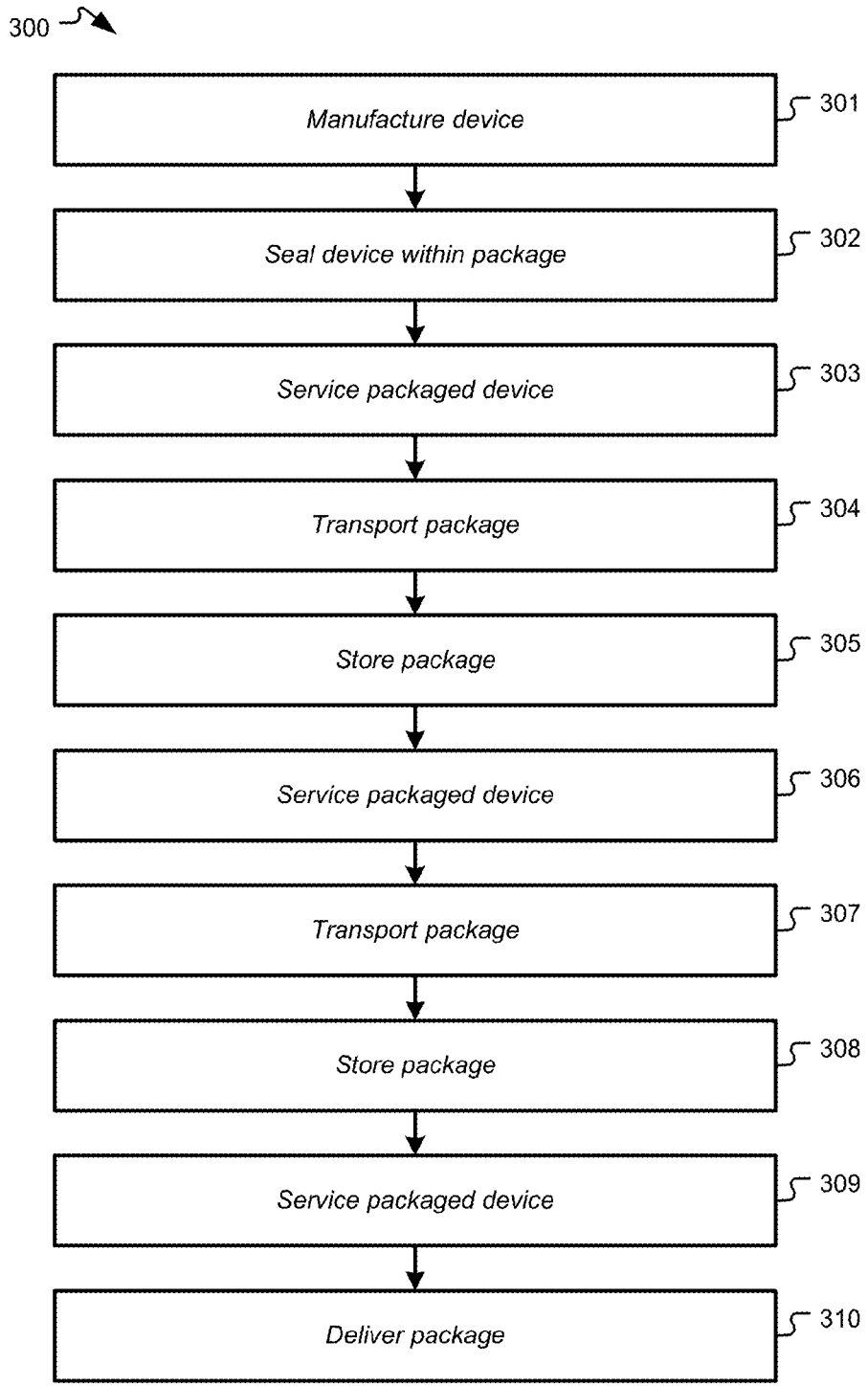
FIG. 3 is an illustrative flowchart of a servicing method in accordance with embodiments of the present invention.

FIG. 3 is an illustrative flowchart 300 of a servicing method in accordance with embodiments of the present invention. In step 301, a device, such as the device 110, may be manufactured at a first location. For example, the device may be manufactured at a manufacturer's location, such as a factory. In some embodiments, the manufactured device is complete and ready for sale to the customer. In other embodiments, the manufactured device may be a finished product with respect to hardware, but not with respect to software. For example, software to run the device may still be in development after the device is manufactured.

In step 302, the manufactured device may be sealed within a package, such as package 120. Prior to being sealed within the package, the device may be coupled to an adapter 130 comprising a connector 136, an umbilical portion 134 and a contact 132 provided on the exterior of the package at a connection region 131, allowing for service of the device even though the device is sealed within the package.

In step 303, the device sealed within the package may be serviced. Such servicing may occur shortly after the device is sealed within the package, for example, to test the umbilical connection to the device or inspect other features of the device such as the battery charge, software, hardware, or other aspect of the device's operation.

In step 304, the package may be transported to a second location. For example, the package may be moved to a warehouse, such as a manufacturer's warehouse that may be in the same building where the device was manufactured, or a different building. Alternatively, the package may be shipped to a wholesaler, which may entail international shipment. Alternatively, when the device is manufactured by a third-party, the package may be shipped to the developer or designer of the device. In step 305, the package may be stored, such as storing the package in a warehouse, a storage facility, or the like. The package may be stored individually, or grouped with other packages into a larger container, such as on a pallet, in a shipment box, or other container.

In step 306, the device may be serviced again. For example, the device may be inspected, tested, audited or interrogated. Additionally, while in storage, new software applications or software updates may have become available, or the battery of the device may have depleted and need to be charged. In some embodiments, if the device will be sold by a retailer, the device may be tailored specifically to that retailer. For example, software specific to the retailer may be installed. Accordingly, it may be desirable to service the sealed device before it is transported from a storage facility.

In step 307, the package may be transported to a third location. For example, the package may be shipped to a retailer or a fulfillment center. In step 308, the package may be stored. For example, the package may be displayed for a retailer's customers or stored in a backroom of a retailer's store. Alternatively, the package may be stored in a fulfillment center, from where it may be picked and delivered to a customer.

In step 309, the device sealed in the package may be serviced. For example, a customer may have selected the device for purchase, and the device may be configured for that particular customer. Such configuration may include uploading content to the device, such as an electronic book, song or movie. The configuration may also include provisioning the device for use with the customer's cellular service provider and/or with the customer's existing cellular phone number. The configuration may also include configuring the device with a username and/or password selected specifically for that customer. Alternatively, the device's battery may need to be recharged and software may need to be installed, updated or configured.

In step 310, the device sealed in the package may be delivered to a fourth location, for example a customer or other entity. The package may be delivered by shipment, or may be delivered directly to a customer in a retail store. In this exemplary method, although the device may have been serviced three times at three different locations in steps 303, 306 and 309, the device has remained sealed in the package at least until delivery of the package to the customer. It is understood that steps may be added or subtracted, such as transporting the package to a fifth location, or not transporting a package to a third location, as in step 307. It is also understood that servicing a device may occur before, during or after transportation of the package.

It is to be understood that steps 303, 306, and 309 are interchangeable. For example, although provisioning is described with step 309, such may be performed at steps 303 or 306. It is further to be understood that any of steps 303, 306, and 309 may be combined with other steps. For example, a device may be provisioned, as in step 309, during transportation of the package, such as at step 304. For example, a dock may be placed on a delivery truck. It is to be further understood that steps of servicing a packaged device may be added or omitted from the servicing method.

Figure 4:
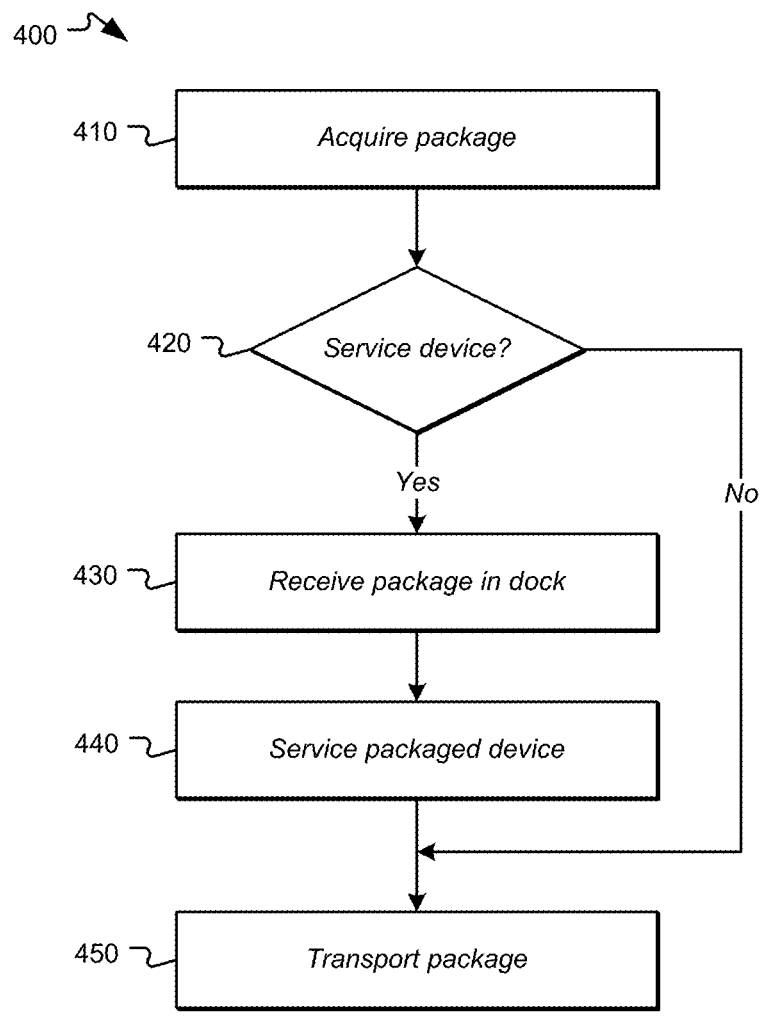
FIG. 4 is an illustrative flowchart of a servicing method in accordance with embodiments of the present invention.

FIG. 4 is an illustrative flowchart of a servicing method 400 in accordance with embodiments of the present invention. In step 410, a package that contains a device is acquired. The package may be the package 120, and the device may be the device 110. The package may be acquired or retrieved from any storage location such as a nearby shelf or a distant warehouse.

In step 420, it is decided whether to service the device that is sealed in the package. For example, the device may receive a data signal or a power signal while the device is still inside the unopened package. The device may perform some action in response to receiving the data signal or the power signal, such as recharging of the device's battery, download and installation of software, or initiation of a communication session with an external computer for other purposes. If the device is not to be serviced, then the method proceeds to step 450. If the device is to be serviced, then the method proceeds to step 430. In step 430, the connection region 131 on the package is coupled with a dock, e.g., dock 140, which, in turn, is coupled to the servicing system 240. In step 440, the device may be serviced while remaining sealed within its package. When servicing is complete, the package may be decoupled from the dock. In step 450, the package may be transported away from the dock, such as to a nearby shelf or to a different location.

As described above, FIG. 1 illustrates a perspective view of an example packaging system 100 in accordance with various embodiments of the present invention. The system 100 comprises a package 120, an adapter 130, and a dock 140. The package 120 has a base 122, a first sidewall 124 attached to the base 122 along a lower edge, a second sidewall 125 attached to the base 122 along a lower edge and attached to the first sidewall 124 along a side edge, a third sidewall 126 attached to the base 122 along a lower edge and attached to the second sidewall 125 along a side edge, and a fourth sidewall 127 attached to the base 122 along the lower edge, attached to the third sidewall 126 along a side edge and attached to the first sidewall 124 along another side edge. Any or all of the base 122 and the sidewalls 124, 125, 126, 127 may comprise non-electrically conductive material, such as fiberboard.

The four edges of the base 122 are coupled to the sidewalls 124-127. The upper edges 124'-127' of the sidewalls 124-127 may define an opening of the package 120 through which a device may be placed. As depicted in FIG. 1, the base 122 may be opposite the opening. Furthermore, the opening may be sealed by a cover, which may be integrally formed with one of the sidewalls 124-127, such that the upper edge of the sidewall integrally formed with the cover comprises a fold seam in a single continuous sheet of material forming both the cover and the sidewall. Alternatively, the cover may be separate from the sidewalls of the package 120. The base 122, the first sidewall 124, the second sidewall 125, the third sidewall 126, the fourth sidewall 127 and a cover may form a cavity within which a device may be placed.

Coupled to the first sidewall 124 of the package 120 is an adapter 130, which provides umbilical connection to the device 110 contained in the package. The adapter 130 may include an umbilical portion 134, which may comprise at least one conductive lead, and a contact 132 formed on a distal end of the umbilical portion 134 in the connection region 131. Although FIG. 1 depicts the connection region 131 as located on the first sidewall 124, it is to be understood that the connection region 131 may be located on the base 122, on any of the sidewalls, 124-127, or on the cover (not shown). In the case of a device having a port according to the Universal Serial Bus ("USB") standard, there may be four leads of the umbilical portion 134 corresponding to the four conductive pins of the USB port. As shown, the contact 132 of the at least one lead of the umbilical portion 134 may be externally exposed via at least one aperture or opening of the first sidewall 124. The contacts 132 in the connection region 131 may be formed on a plane substantially parallel to the plane defined by the sidewall 124 of the package 120. The contact 132 may be flush with a sidewall 124 of the package 120. In other embodiments, the contact 132 may be positioned or adhered to the interior of the first sidewall 124, such that the contact 132 is exposed through the at least one aperture of the sidewall 124. In some embodiments, a removable tab or flap may cover the aperture, such that the contact 132 is hidden from view or protected. In other embodiments, the contact region 131 may be a port, such as a USB port, and the contacts 132 may be pins of the USB port.

The umbilical portion 134 in the adapter 130 may include a middle portion comprising, for example, a flexible cable or conductive flexible film. The middle portion may be flexible or stiff, or any combination of flexible portions and stiff portions. The proximal end of the umbilical portion 134 may be coupled to a connector 136. The connector 136 may be configured to couple with a servicing interface (e.g., port 111) of the device 110. For example, in the case of the device having a USB port, the connector 136 may be a USB connector. Alternatively, the connector 136 may comprise disposable or non-durable materials, such as cardboard and wire such that respective wires are held in contact with respective pins of the port 111, but may withstand repeated coupling and decoupling from the port 111. It is to be understood that the umbilical portion 134 may comprise a lead that comprises the same material as a contact 132, such as foil. Under such a configuration, such a lead and contact may be indistinguishable. Accordingly, in some embodiments, a lead and a contact may be used interchangeably.

When a device is placed inside the package 120, the port 111 of the device 110 may face any direction, such as towards any one of the sidewalls 124-127. To accommodate the various placements of a device port 111, the middle portion of the adapter 130 may have a length and flexibility in order for the connector 136 to reach the device port 111. In some embodiments, the middle portion of the adapter 130 may be attached to support materials on the inside of the package 120.

The package 120 may be coupled to the dock 140 for servicing. In some embodiments, the package 120 may be moved to a dock 140, which is held in a fixed position, such as in an operator's workstation. In other embodiments, the dock 140 may be moved to the package 120. The dock may have at least one contact 142, such as a pin configured to electrically couple to a corresponding one of the contacts 132 in the connection region 131 of the package 120. For example, if there are four contacts 132, there may be four corresponding contacts 142. The contacts 142 may be provided on a housing 144 of the dock 140. In some embodiments, the contacts 142 may be spring-loaded. A cable 146 or a wireless network adapter may also be attached to the housing 144. The cable 146 may be coupled to a servicing system, such as the servicing system 240, to enable the servicing system to communicate with the device 110 in the package 120 via the dock cable 146, the dock housing 144, the at least one dock contact 142, the at least one contact 132, the least one adapter lead of the umbilical portion 134, and the adapter connector 136. In some embodiments, a dock 140 may be a port replicating dock that receives the device 110 having a port 111, and the port 111 may be replicated by the dock. In some embodiments, the replicated port of the dock 140 may be a port that can receive a connector similar to the connector 136 of the adapter 130. In some embodiments, the replicated port of the dock 140 may have a different configuration than the port 111 of the device 110.

The package 120 may be guided onto the dock 140 with an alignment feature 148 to align the package 120 with the dock 140 such that the contacts 132 of the package 120 are aligned with the corresponding contacts 142 of the dock 140. The alignment feature 148 may be formed on an end of the housing 144 so as to abut a sidewall 125, thereby aligning the contacts 132 with the contacts 142. In some embodiments, the same dock 140 may be used with packages of different sizes. If the contacts 132 on the various packages are positioned the same distance from the sidewall 124, the alignment feature 148 can be used with various sized packages to easily establish a reliable electrical connection between the contacts 132 and contacts 142. In some embodiments, two alignment features may be used to abut two orthogonal edges of the packages 120, thereby enabling easily alignment of the contacts in two dimensions.

As shown, the first sidewall of a package is depicted with a relatively straight and flat wall. However, a first sidewall of the package may be arched, curved, jagged, or have an otherwise non-planar surface.

In some embodiments, the connection region 131 may be formed so as to be easily removable from the sidewall 124 of the package 120, such as by having a tear-away feature. It may be desirable to remove the connection region 131 once all servicing of the device 110 has been completed. This may improve the aesthetic appearance of the package 120 and/or prevent inadvertent or undesired electrical connection with the contact region 131.

It is to be understood that the coupling of the package 120 and the dock 140 may be performed using any technology suitable for data and/or power transmission, such as, for example, electrical, RF, optical, thermal, acoustic, or any other transmission medium.

Figure 5:
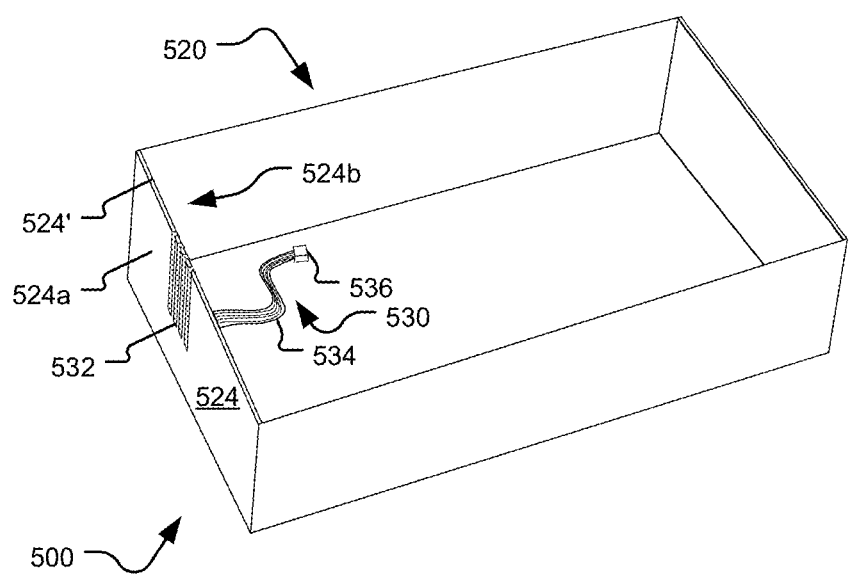
FIG. 5 illustrates a perspective view of an example package in accordance with embodiments of the present invention.

FIG. 5 illustrates a perspective view of an example packaging system 500 in accordance with various embodiments of the present invention. The packaging system 500 comprises a package 520, and an adapter 530. Furthermore, the packaging system 500 may include a dock such as the dock 140.

The package 520 may be similar to the package 120, except that the externally exposed contacts 532 may be formed in a different way. For example, in embodiments described above, the sidewall 124 includes apertures exposing the contacts 132. In FIG. 5, contacts 532 formed on the distal ends of the umbilical portion 534 are externally exposed by being formed, at least partially, on the exterior surface 524a of the first sidewall 524. For example, the at least one contact 532 may be formed on the first sidewall 524 to be located on a path traveling along the exterior 524a of the first sidewall 524, traversing the upper edge 524' of the first sidewall 524 and traveling along the interior 524b of the first sidewall 524.

The contacts 532 may be formed in a variety of ways. For example, the contacts 532 may be a conductive foil comprising, for example, a malleable metallic material, such as copper, that is adhered to the package 120. Alternatively, the contacts 532 may comprise conductive ink printed onto the sidewall 524 of the package 120. Alternatively, the contacts 532 may comprise a conductive ribbon or other conductive lead having a planar profile.

In some embodiments, the externally exposed contacts 532 may be camouflaged on a first sidewall, such as by incorporating the exposed contacts 532 into a logo or other marketing design of a package. In some embodiments, the contacts 532 may include an outer layer comprising a conductive ink. In some embodiments, portions of the contacts 532 that are external to the package 120 may be masked with non-conductive ink to provide better isolation of the conductive ink portion of the contacts 532. The combination of conductive and nonconductive ink may form a logo, lettering, or other graphic over the contacts 532.

In some embodiments, the contacts 532 may be respectively covered with a conductive foil in the shape of a design. In some embodiments, a nonconductive material, such as a sticker, may overlay portions of the contacts 532. In some embodiments, the externally exposed contacts 532 may be in the shape of a logo or other graphical element. For example, each contact 532 could be formed using a conductive surface in the shape of letter, such that multiple contacts 532 formed in different letters can be used to spell out a word, such as the name of the manufacturer's company, the name of a device or the retail seller of the device. In some embodiments, the contacts 532 may be formed so as to be easily removable from the sidewall 124 of the package 120, such as by having a tear-away feature.

Figure 6:
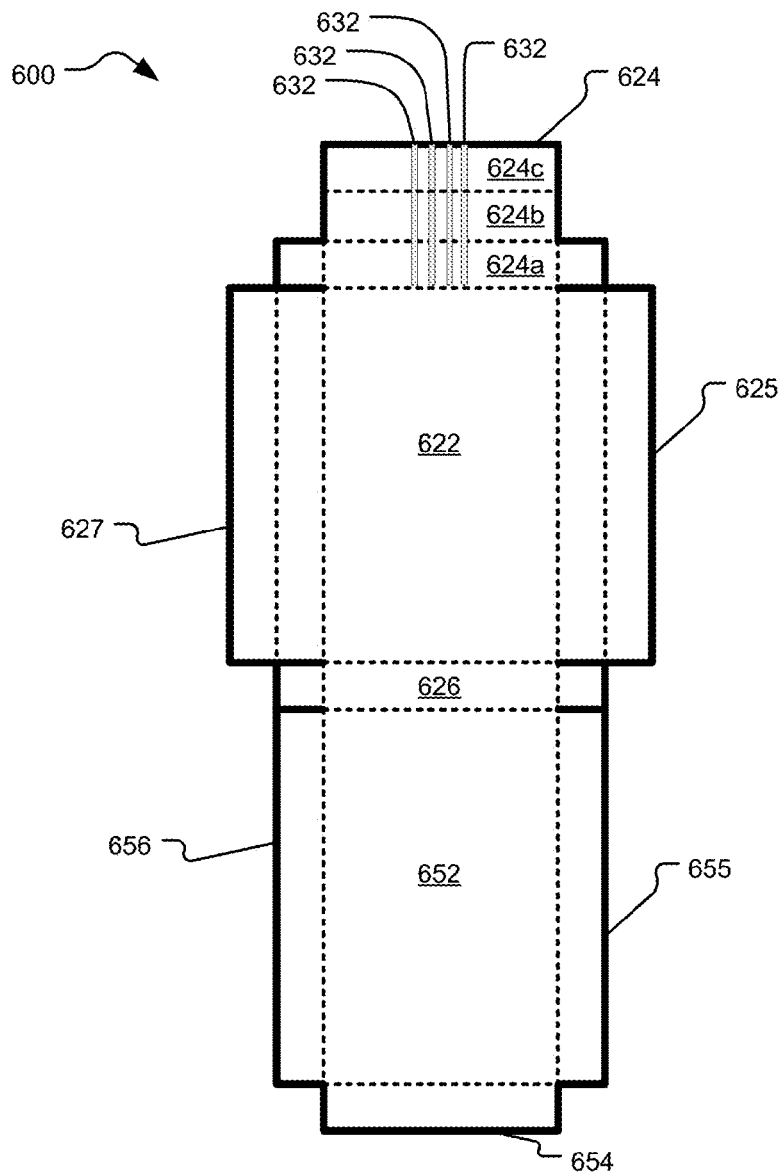
FIG. 6 illustrates a package in accordance with embodiments of the present invention.

FIG. 6 illustrates a package 600 in accordance with various embodiments of the present invention. As shown, the package 600 may be integrally formed from a single piece of material, with the dotted lines representing fold lines and the dark lines representing cut lines, wherein, after folding the illustration, the majority of the dotted fold lines would generally form the edges of the exterior of the package 600. The package 600 may have a base 622, a first sidewall 624, a second sidewall 625, a third sidewall 626 and a fourth sidewall 627. As shown, the second sidewall 625 and the fourth sidewall 627 may be double walled. The first sidewall 624 may also be double walled, and may have an additional portion configured to extend along the base 622. The contacts 632 may be formed onto or adhered to the sidewall 624 before the package is folded. By forming the contacts 632 on the sidewall 624 while the package 600 is unassembled and still configured as a flat sheet of cardboard, the forming of the contacts 632 may be more easily accomplished. In order to strengthen the structure of the bottom portion of the package 600, the first sidewall 624 and the third sidewall 626 may each have two tabs that may be folded within the double wall respectively of the second sidewall 625 and the fourth sidewall 627. The cover 652, which may be attached to the third sidewall 626, may have additional structure through the first flap 654, the second flap 655 and the third flap 656.

In one embodiment, the contacts 632 of an adapter may be adhered to the first sidewall 624. For example, the contacts 632 may comprise conductive printed ink that is printed on a folded package to allow the printed ink to run from the outside of the package to the inside of the package. As shown, the contacts 632 may be externally exposed on the exterior portion 624a when the first flap 654 of the cover 650 is tucked within the first sidewall 624. The contacts 632 may travel on a path over a fold connecting interior portion 624b and exterior portion 624a. Thus, the contacts 632 may be on the interior of the package 600 when the contacts 632 are formed on the interior portion 624b. In addition, it may be desirable for an extension portion 624c to extend into the package 600 along the base 622. The contacts 632 may then be coupled to a middle portion of an adapter, such as the umbilical portion 534 of the adapter 530. It is understood that there may be, as shown, four contacts 632.

Figure 7:
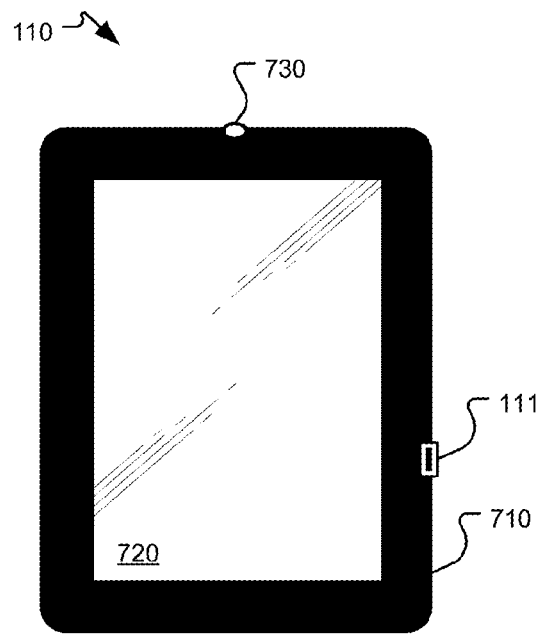
FIG. 7 illustrates a device in accordance with embodiments of the present invention.

FIG. 7 illustrates a device 110 in accordance with various embodiments of the present invention. Although one example of a device is shown, it should be understood that various other types of devices can be used in accordance with various embodiments discussed herein. In this example, the device 110 has a bezel 710, a display 720, a power button 730 and a port 111, such as a standard, mini or micro USB port. In some embodiments, a device is woken up when a connector is plugged into the port 111.

Figure 8:
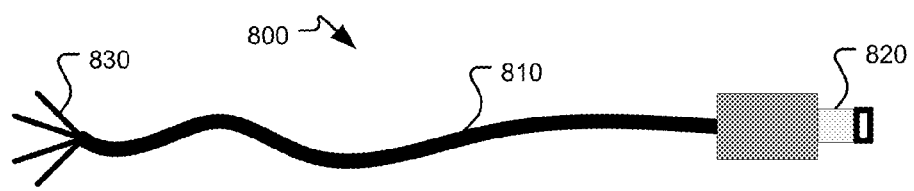
FIG. 8 illustrates an adapter in accordance with embodiments of the present invention.

FIG. 8 illustrates an adapter 800 for coupling with the device 110, in accordance with various embodiments of the present invention. Although one example of an adapter is shown, it should be understood that various other types of adapters can be used in accordance with various embodiments discussed herein. In this example, the adapter 800 has four contacts 830, an umbilical portion 810 comprising a flexible cable and a connector 820, such as a standard, mini or micro USB connector.

Figure 9A:
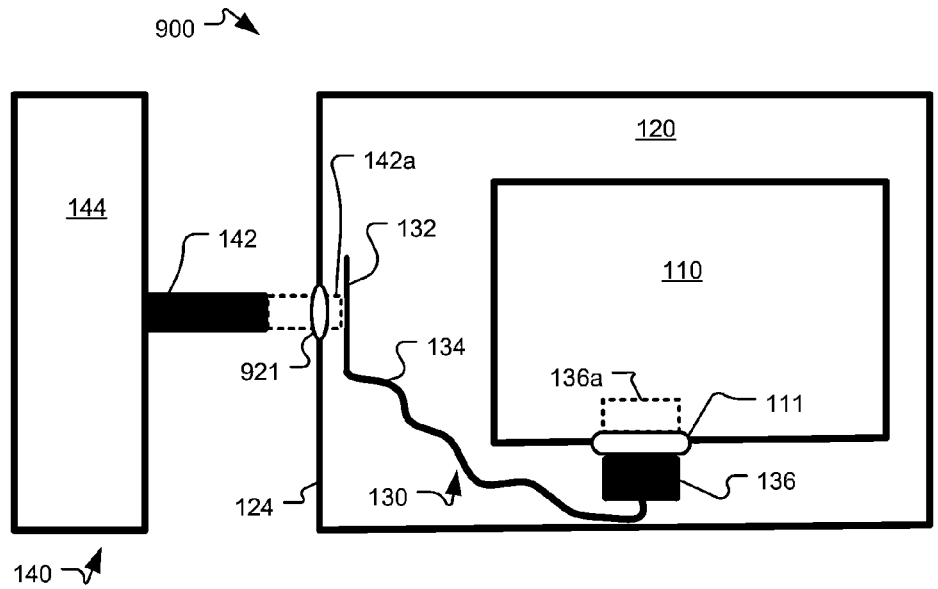
FIGS. 9A and 9B illustrate a packaging system in accordance with embodiments of the present invention.

FIG. 9A illustrates a packaging system 900 in accordance with various embodiments of the present invention. As in FIG. 1, the package 120 has a first sidewall 124. The package 120 also has at least one aperture 921. The housing 144 of the dock 140 has at least one contact 142, which can be inserted through the aperture 921, as illustrated with the dotted-line segment 142a. Accordingly, the contacts 142 may come into contact with the contacts 132 of the adapter 130, wherein the contacts 132 have a portion located on the interior of the package 120. The adapter 130 may comprise the umbilical portion 134, the one or more contacts 132 and the connector 136. The connector 136 may connect with the device 110 by coupling with the port 111, as illustrated with the dotted-line segment 136a. Thus, the packaging system 900 illustrates an example of a contact 132 being externally exposed through an aperture 921 of the package 120. In other words, in some embodiments, but for the adapter 130, the device port 111 would be inaccessible when the device 110 is sealed in the package 120. Accordingly, in some embodiments, the adapter 130 may extend the device port 111 to the exterior surface of the package 120.

In some embodiments, the contacts 142 of the dock may pierce the material of the first sidewall 124 and create the aperture 921 of the package 120, through which the contact 142 may come into contact with the corresponding contact 132.

Figure 9B:
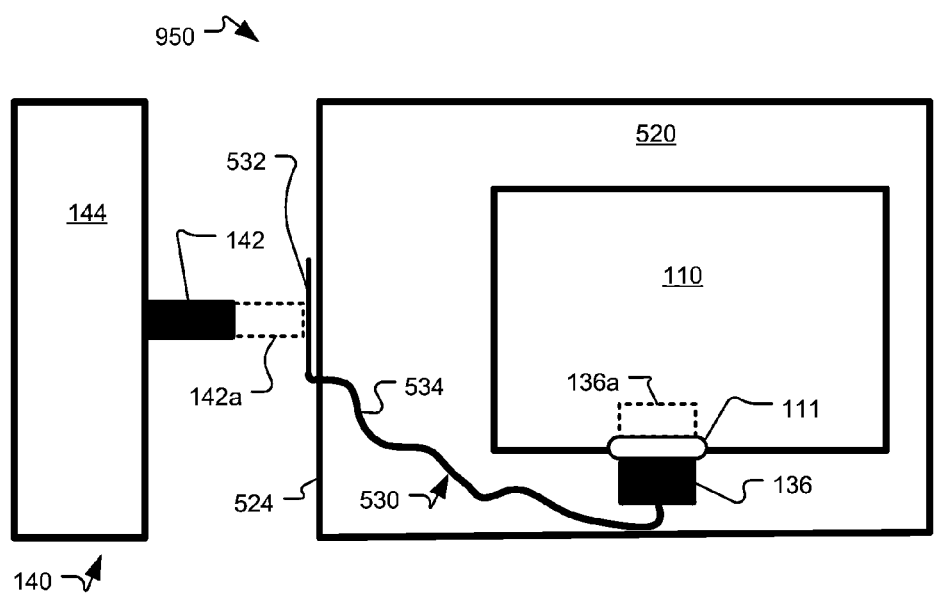

FIG. 9B illustrates a packaging system 950 in accordance with various embodiments of the present invention. As in FIG. 5, the package 520 has a first sidewall 524. The housing 144 of the dock 140 has at least one contact 142. Accordingly, the contacts 142 may come into contact with the contacts 532 of the adapter 530, as illustrated with the dotted-line segment 142a, wherein the contacts 532 are located on the exterior of the package 520. The connector 536 may connect with the device 110 by coupling with the port 111, as illustrated with the dotted-line segment 536a. Thus, the packaging system 950 illustrates an example of a an adapter 530 comprising an umbilical portion 534, and a contact 532 being externally exposed by the placement of a portion of the contact 532 on the exterior of the package 520.

Figure 10:
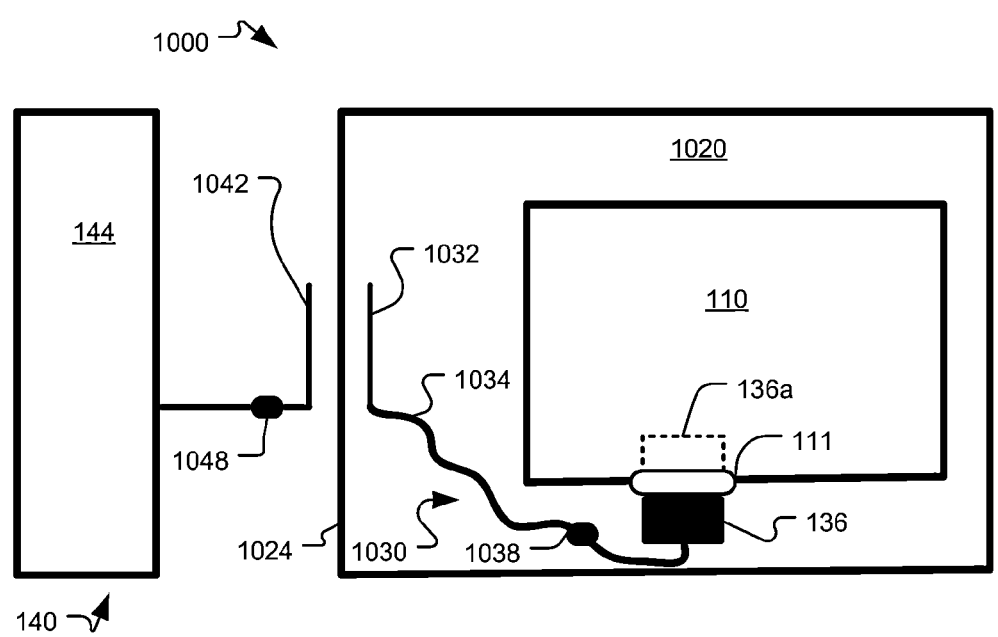
FIG. 10 illustrates a packaging system in accordance with embodiments of the present invention.

FIG. 10 illustrates a packaging system 1000 in accordance with embodiments of the present invention. The package 1020 has a first sidewall 1024. The adapter 1030 comprises a connector 136, an umbilical portion 1034, a receiving power circuit 1038, and a receiving inductive coil 1032. The dock 140 comprises a generating power circuit 1048 and a generating inductive coil 1042. When the receiving inductive coil 1032 is positioned in proximity to the generating inductive coil 1042, the receiving inductive coil 1032 may receive power through induction from the generating inductive coil 1042. For example, the generating power circuit 1048 may generate a current in the generating inductive coil 1042, which in turn may generate a current in the receiving inductive coil. 1032. The receiving power circuit in turn may control the flow of power to the device 110.

Figure 11:
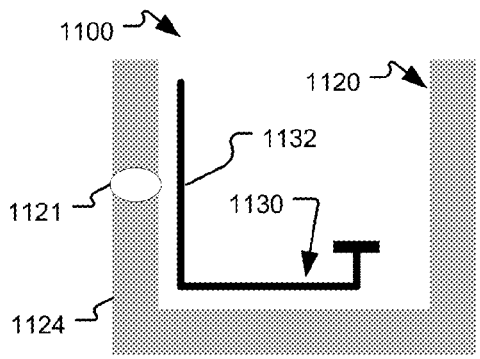
FIGS. 11-16 illustrate packaging systems in accordance with various embodiments of the present invention.

FIGS. 11-16 illustrate packaging systems in accordance with various embodiments of the present invention. FIG. 11 illustrates a packaging system 1100 in which the package 1120 comprises a first sidewall 1124. The sidewall 1124 comprises aperture 1121 through which a portion of the contact element 1132 of the adapter 1130 may be externally exposed for coupling with a corresponding contact 142 on a dock 140. As shown, the contact element 1132 is adhered to the interior of the first sidewall 1124.

Figure 12:
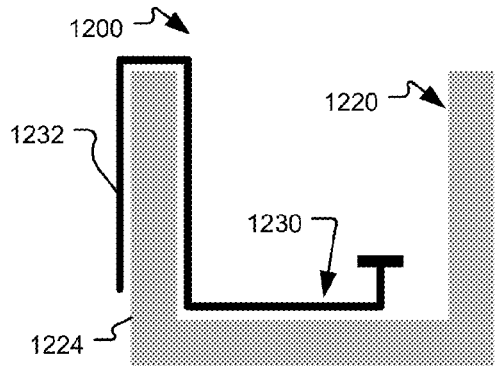

FIG. 12 illustrates a packaging system 1200 in accordance with various embodiments of the present invention. The package 1220 comprises a first sidewall 1224. As shown, the contact element 1232 of the adapter 1230 is adhered to the interior of the package 1220, wraps over the top edge of the first sidewall 1224, and is adhered to the exterior of the sidewall 1224 for coupling with a corresponding contact 142 on a dock 140.

Figure 13:
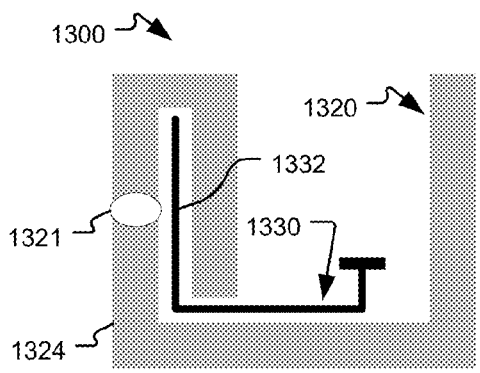

FIG. 13 illustrates a packaging system 1300 in accordance with various embodiments of the present invention. The package 1320 comprises a first sidewall 1324. The sidewall 1324 is double walled, and comprises the aperture 1321 through which a contact element 1332 of the adapter 1330 may be externally exposed for coupling with a corresponding contact 142 on a dock 140. As shown, the contact element 1332 is adhered in between the double walls of the first sidewall 1324.

Figure 14:
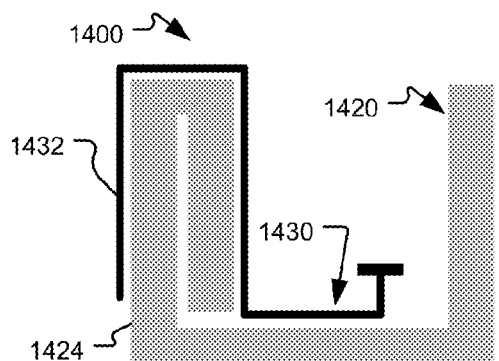

FIG. 14 illustrates a packaging system 1400 in accordance with various embodiments of the present invention. The package 1420 comprises a first sidewall 1424, which is double walled. As shown, the contact element 1432 of the adapter 1430 is adhered to the interior of the package 1420, wraps over the top edge of the first sidewall 1424, and is adhered to the exterior of the sidewall 1424 for coupling with a corresponding contact 142 on a dock 140. The configuration depicted in FIG. 14 may be advantageous for printing the contact element 1432 onto the first sidewall 1424.

Figure 15:
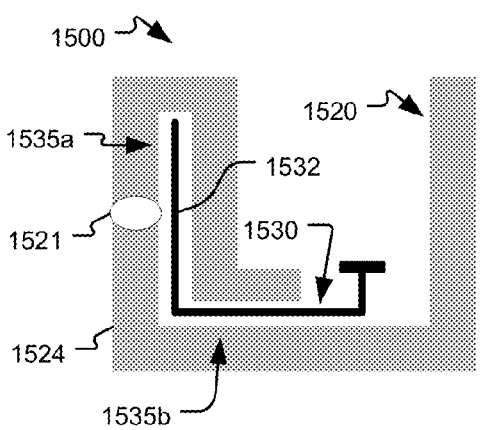

FIG. 15 illustrates a packaging system 1500 in accordance with various embodiments of the present invention. The package 1520 comprises a first sidewall 1524. The sidewall 1524 is double walled with a portion extending into the package 1520, and comprises the aperture 1521 through which a contact element 1532 of the adapter 1530 may be externally exposed for coupling with a corresponding contact 142 on a dock 140. As shown, a portion 1535a of the contact element 1532 is adhered in between the double walls of the first sidewall 1524, and a portion 1535b of the contact element 1532 is adhered under the extending portion of the sidewall 1524. It is to be appreciated that the portion 1535b may be hidden from view by the extending portion of the first sidewall 1524. The extending portion of the first sidewall 1524 can provide protection for the portion of the adapter 1530 covered by the extending portion, can provide additional structural rigidity to the package 1520, and may also provide an aesthetic improvement to the packaging system 1500 by reducing the amount of wiring visible by the consumer when viewing the interior of the package 1520.

Figure 16:
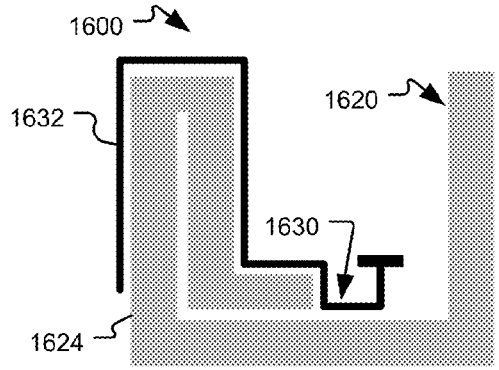

FIG. 16 illustrates a packaging system 1600 in accordance with various embodiments of the present invention. The package 1620 comprises a first sidewall 1624. The sidewall 1624 is double walled with a portion extending into the package 1620. As shown, the contact element 1632 of the adapter 1630 is adhered to the interior of the package 1620, wraps over the top edge of the first sidewall 1624, and is adhered to the exterior of the sidewall 1624. The configuration depicted in FIG. 16 may be advantageous for printing the contact element 1632 onto the first sidewall 1624 such that the umbilical portion of the adapter 1630 can be coupled to the portion of the contact element 1632 printed on the portion of the first sidewall 1624 that extends into the package 1620. The extending portion of the first sidewall 1624 can provide additional structural rigidity to the package 1620.

It is understood that the illustrated embodiments of FIGS. 11-16 are representative of possible configurations of a contact element adhered to a sidewall, and are not intended to be exhaustive or to limit the embodiments to the precise form disclosed. For example, there may be more than one contact element of an adapter, such as four contact elements for a USB connection to a device. Furthermore, there may be more or fewer apertures of a sidewall for each contact element to be at least partially exposed. Furthermore, a sidewall may be triple walled with folded material, or portions of a sidewall may be adhered or glued together.

Figure 17:
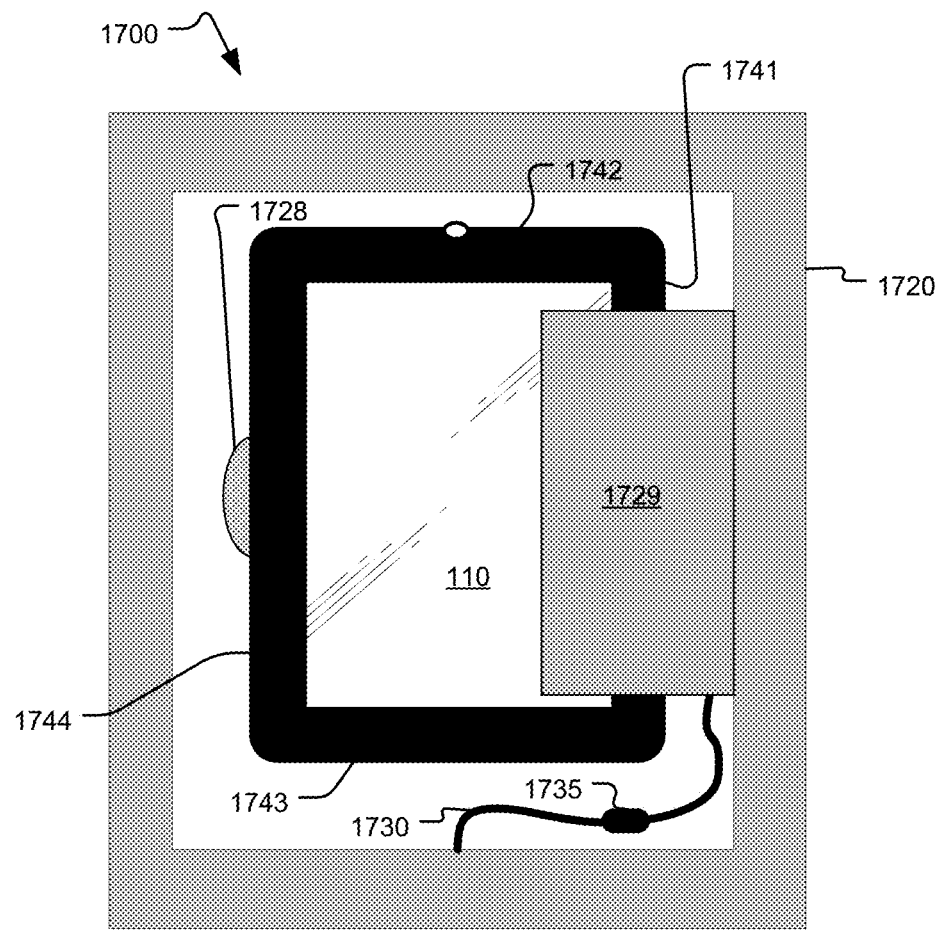
FIG. 17 illustrates a packaging system in accordance with embodiments of the present invention.

FIG. 17 illustrates a packaging system 1700 in accordance with various embodiments of the present invention. The device 110 is contained within the package 1720, and the adapter 1730 is coupled to a port (not shown) along the a first edge 1741 of the device 110. The package 1720 comprises a withdrawal guide 1729 and a withdrawal facilitator 1728 to respectively guide and facilitate withdrawal of the device 110 from the package 1720. A user typically withdraws a device 110 from a package 1720 by first lifting one edge of the device 110 from a form-fitting tray within the package 1720, and then withdrawing the rest of the device 110 from the tray. The withdrawal guide 1729 extends sufficiently far past the edge 1741 of the device 110 to inhibit or prevent a user from lifting the covered edge 1741 of the device 110 first. The other edges 1742-1743 of the device 110 are also difficult to withdraw from the tray first. The user would be forced to slightly lift edge 1728 from the tray, and then slide the device 110 laterally to withdraw the device 110 from underneath the withdrawal guide 1729 before fully withdrawing the device 110 from the package 1720. The lateral movement of the device 110 to withdraw the device 110 from underneath the withdrawal guide 1729 decouples the connector of the adapter 1730 from the port of the device 110. Therefore, the removal of the connector of the adapter 1730 from the device 110 can occur without causing damage to a port of the device 110, such as might occur if the device 110 is withdrawn in a direction non-parallel with the direction of insertion of the adapter 1730 into the port of the device 110. In other embodiments, the device may be contained in a tray that overlaps and secures all of the edges of the device, thereby securely retaining the device within the tray. A recessed portion of the tray may be formed along the edge opposite the communication port of the device, thereby guiding the user to insert a finger into the recessed portion of the tray in order to lift that edge out of the tray first before withdrawing the rest of the device from the tray. This would also guide the user into withdrawing the device in a direction away from the communication port edge of the device.

In some embodiments, the connector of the adapter 1730 is held in place in the port of the device 110 by pressure from the package, such as pressure from the withdrawal guide 1729, and the connector of the adapter 1730 is automatically decoupled from the port of the device 110 as the device 110 is removed from the packaging. In other embodiments, the middle portion of the adapter 1730 is coiled such that it springs back when the packaging is opened, causing the connector of the adapter 1730 to decouple from the port of the device 110. In some embodiments, a tear strip that opens the package is attached to the adapter 1730 such that the connector of the adapter 1730 is decoupled from the port of the device 110 when the tear strip is torn away from the package.

In some embodiments, the adapter 1730 may comprise a circuit protection component 1735 to protect the device 110, for example, to reduce damage from excess current flow or other intended or unintended voltage applied to one of the contacts 132. The circuit protection component 1735 may be a fuse, a circuit breaker or the like. In some embodiments, the circuit protection component 1735 may comprise a manually-activatable switch that can electrically decouple the device 110 from the contact 132 when the device 110 is not being serviced. In yet other embodiments, the device 110 itself may include circuit protection components to prevent damage caused by intended or unintended voltage.

Figure 18A:
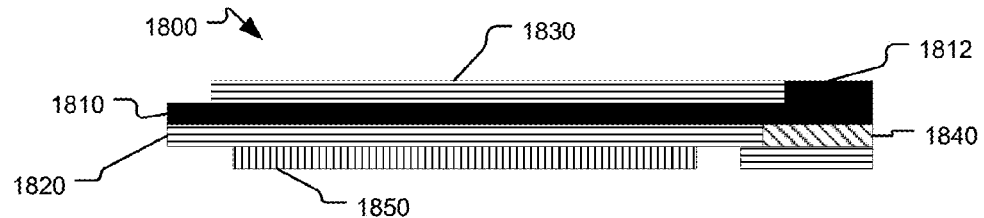
FIGS. 18A, 18B and 18C illustrate an adapter in accordance with embodiments of the present invention.
Figure 18B:
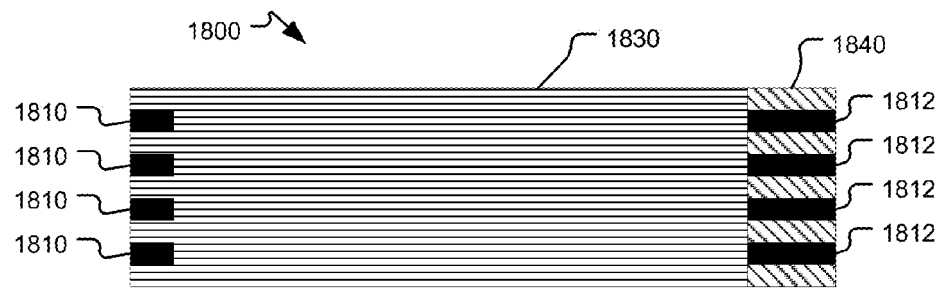
Figure 18C:
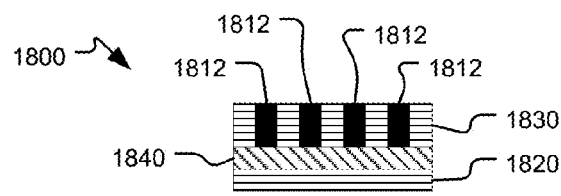

FIGS. 18A, 18B and 18C illustrate views of an adapter 1800 in accordance with embodiments of the present invention. Although one example of an adapter is shown, it should be understood that various other types of adapters can be used in accordance with various embodiments discussed herein. In this example, the adapter 1800 comprises an umbilical portion comprising four conductive leads 1810. In some embodiments, a conductive lead 1810 may comprise a copper trace. In some embodiments, a conductive lead may be applied to a substrate via silk screen printing. At one end of the umbilical portion, a connector of the adapter 1800 may comprise raised portions 1812 of the leads 1810 and a stiffener portion 1840. The raised portion 1812 facilitates connection to a servicing port of an electronic device, such as a standard, mini or micro USB receptacle. Each raised portion 1812 may be stiffened with a stiffener portion 1840, as needed based on the servicing port of an electronic device. At the other end of the umbilical portion, a connection region may be formed, as previously described. Portions of the leads 1810 may be insulatively protected with an insulative substrate, such as a substrate base 1820 and a substrate cover 1830, to generally form the umbilical portion. A substrate may comprise a plastic film, such as thermoplastic or polyethylene, and a substrate may be flexible or rigid.

FIG. 18A illustrates a cross-sectional side view of the adapter 1800. In one embodiment, a lead 1810 may generally travel from one end of the adaptor 1800 to the other end. At one end of the adaptor 1800, a raised portion 1812 is exposed. The raised portion 1812 may be supported by a stiffening portion 1840. The stiffening portion 1840 may comprise cardboard, or any other suitable stiffening material that is non-conductive. At the other end of the adapter 1800, a connection region may be formed in which exposed portions of the leads 1810 may be conductive contact elements. In the middle of the adapter 1800, a substrate base 1820 may be below at least a middle portion of the lead 1810, and a substrate cover 1830 may be above at least a middle portion of the lead 1810, generally forming the umbilical portion of the adapter 1800. Underneath the substrate base 1820, an adhesive component 1850 may adhere the adapter 1800 to the inside of a package. The adhesive component 1850 may comprise double-sided tape, with one side of the double-sided tape adhered to the bottom of the substrate base 1820 and the other side of the double-sided tape temporarily adhering to a release liner that may be removed prior to adhesion of the adapter 1800 to the inside of a package.

FIG. 18B is a top view of the adapter 1800. As shown, the lead 1810 may be exposed at both ends of the adapter 1800 to form a connection region and a connector, and the lead 1810 may be insulated by the substrate cover 1830. The raised portion 1812 may rest on top of a stiffening portion 1840. Notwithstanding the stiffening portion 1840, the adapter 1800 may be flexible so that it may be appropriately routed inside of a package. Such may provide a low-cost and disposable umbilical portion of the adapter 1840 formed, for example, as a ribbon, for hiding the umbilical portion or placing the umbilical portion where it is not generally noticeable.

FIG. 18C is a front view of the adapter 1800, which illustrates a connector that may connect with a servicing port of an electronic device, such as a USB receptacle. The substrate cover 1830, which may be behind the raised portions 1812, may be visible in between the raised portions 1812. Underneath the raised portions 1812 may be the stiffening portion 1840. Underneath the stiffening portion 1840 may be the substrate base 1820. The stiffening portion 1840 may provide support for each raised portion 1812 to facilitate connection with a respective contact of a servicing port of a device. The stiffening portion may also facilitate removal of each raised portion 1812 from the servicing port. Such may provide a low-cost and disposable connector of the adapter 1800.

Figure 19:
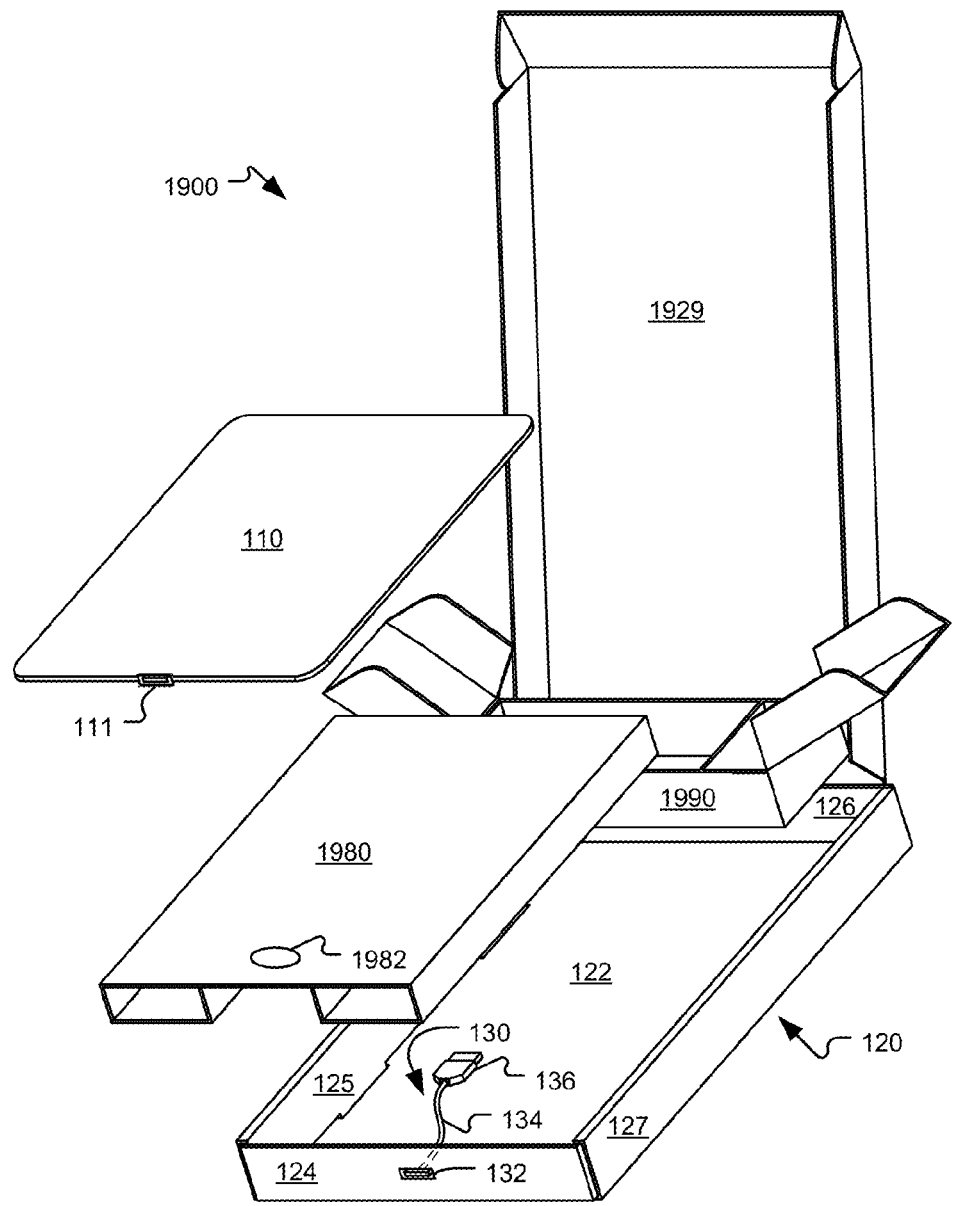
FIG. 19 illustrates an exploded perspective view of an example packaging system in accordance with embodiments of the present invention.

FIG. 19 illustrates an exploded perspective view of an example packaging system 1900 in accordance with embodiments of the present invention. The system 1900 comprises a device 110, a package 120, an adapter 130, a platform 1980 and an accessory box 1990. As described above for FIG. 1, the package 120 has sidewalls 124-127, and as shown in FIG. 19, the package 120 includes a cover 1929, which may provide protection and cushioning for the device 110. As also described above for FIG. 1, the adapter 130 may have at least an umbilical portion 134, contact elements 132 formed on a distal end of umbilical portion 134 and a connector 136 on the proximal end of the umbilical portion 134. The platform 1980 may be placed inside of the package 120 such that it supports and elevates the device 110. The platform 1980 may obscure a portion of the adapter 130 from view when the portion of the adapter 130 is underneath the platform 1980. The accessory box 1990 may be placed within the package 120 to hold accessories associated with the device 110.

It should be understood that the platform 1980 may have different shapes and configurations in order to cushion, void-fill, protect or support the device 110. The platform 1980 may be comprised of any suitable material to cushion, void-fill, protect or support the device 110, such as a tray or insert comprising molded or folded material. Such material may be pulp, foam, cardboard, plastic or the like. The platform 1980 may be configured to elevate the device 110 and create a cavity between the platform 1980 and the base 122 of the package 120. A portion of the adapter 130 may be placed in the cavity, thus the platform's structure may hide from view a portion of the adapter 130. Another portion of the adapter 130 may extend through an aperture 1982 of the platform 1980 such that the connector 136 may extend to the device 110 to connect with the port 111. In some embodiments, the aperture 1982 may be absent from the platform 1980. In such case, a portion of the adapter 130 may extend in a space or gap between the platform 1980 and the package 120.

It should be understood that the adapter 130 may have different forms and may be routed in different ways underneath the platform 1980. For example, the adapter 130 may be similar to that depicted in FIG. 18. The adapter 1800 may be adhered to the inside of the package 120, or underneath the platform 1980. In some embodiments, the aperture 1982 may be a slit or a gap of the platform 1980. The aperture 1982 may be placed anywhere on the platform 1980 in order for the connector 136 to reach the port 111, depending on where the port 111 is located on the device 110. Furthermore, the aperture 1982 may be placed in a trench, indentation, slope or finger scoop of the platform 1980, such as at a location where the port 111 is located. A trench, indentation, slope or finger scoop may also expose the port 111 of the device 110 to the connector 136 of the adapter 130.

In one embodiment, the connector 136 of the adapter 130 may be rigidly or firmly connected to the port 111 of the device 110. In another embodiment, the connector 136 of the adapter 130 may be loosely connected to the port 111 of the device 110. In one embodiment, when the device 110 is removed from the package 120, the connector 136 decouples from the port 111 and rests on top of the platform 1980. In another embodiment, the connector 136 is received into the aperture 1982 when the device 110 is removed from the package 120. Thus, the connector 136 may be hidden from view after the device 110 is removed from the package 120. The umbilical portion 134 may comprise, for example, a spring to pull or exert a force on the connector 136 after it is decoupled from the port 111.

Figure 20:
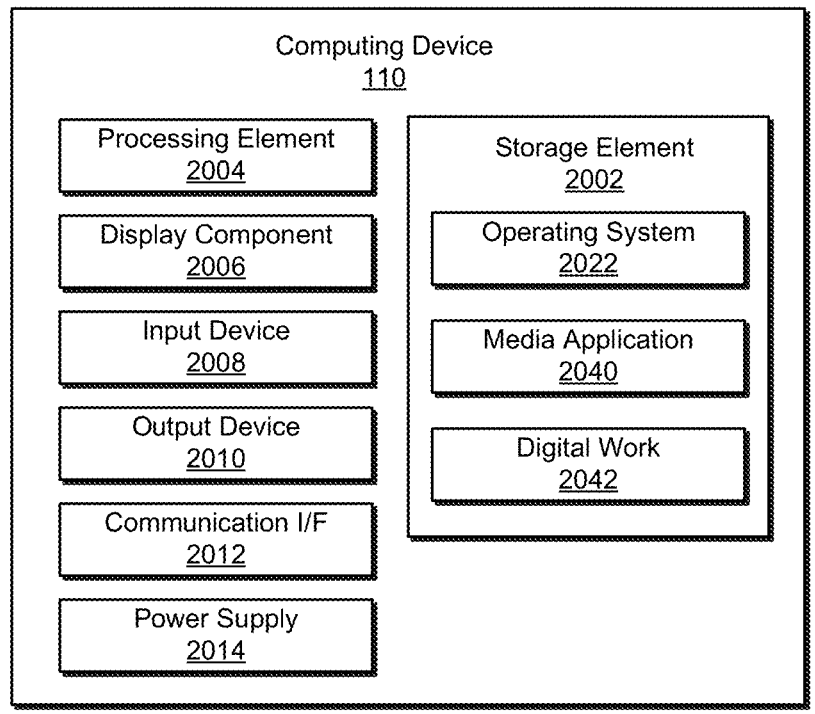
FIG. 20 illustrates an exemplary block diagram of an electronic device, in accordance with embodiments of the present invention.

FIG. 20 illustrates an exemplary block diagram of an electronic device 110, in accordance with embodiments of the present invention. The electronic device 110 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein.

The electronic device 110 may include a display component 2006. The display component 2006 may comprise, for example, one or more devices such as cathode ray tubes (CRTs), liquid crystal display (LCD) screens, gas plasma-based flat panel displays, LCD projectors, or other types of display devices, etc.

The electronic device 110 may include one or more input devices 2008 operable to receive inputs from a user. The input devices 2008 can include, for example, a push button, touch pad, touch screen, wheel, joystick, keyboard, mouse, trackball, keypad, accelerometer, light gun, game controller, or any other such device or element whereby a user can provide inputs to the electronic device 110. These input devices 2008 may be incorporated into the electronic device 110 or operably coupled to the electronic device 110 via wired or wireless interface. For computing devices with touch sensitive displays, the input devices 2008 can include a touch sensor that operates in conjunction with the display component 2006 to permit users to interact with the image displayed by the display component 2006 using touch inputs (e.g., with a finger or stylus).

The electronic device 110 may also include at least one communication interface 2012, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the electronic device 110 may also include one or more wired communications interfaces for coupling and communicating with other devices.

In accordance with some embodiments, a wired connection with the servicing dock may be established with the electronic device 110 via the servicing dock and the connection region of the package, while a wireless connection is also established between the electronic device 110 and another computing device. Accordingly, some servicing operations may be established via the servicing dock, such as, e.g., powering and recharging the electronic device, while other servicing operations may be performed wirelessly via the communication interface 2012, such as, e.g., updating or installing software on the electronic device and/or provisioning the electronic device for use on a cellular network. In some embodiments, a wired connection with the servicing dock may cause electronic device 110 to power on, after which a command is generated for the electronic device 110 to search for a known wireless signal through which data can be transferred. In other words, connecting a package device to a dock may cause the device to go into wireless seek mode for wireless servicing of the device.

The electronic device 110 may also include a power supply 2014, such as, for example, a rechargeable battery operable to be recharged through conventional plug-in approaches, or through other approaches such as capacitive charging.

The electronic device 110 also includes a processing element 2004 for executing instructions and retrieving data stored in a storage element 2002. As would be apparent to one of ordinary skill in the art, the storage element 2002 can include one or more different types of memory, data storage or computer-readable storage media, such as, for example, a first data storage for program instructions for execution by the processing element 2004, a second data storage for images or data and/or a removable storage for transferring data to other devices.

The storage element 2002 may store software for execution by the processing element 2004, such as, for example, operating system software 2022 and media application 2040. The storage element 2002 may also store data, such as, for example, files corresponding to one or more digital works 2042.

In accordance with some embodiments, software and/or data may be stored in the storage element 2002 via the package adapter. This may be useful to install software or other files, such as digital works 2042, for a particular purchaser of the electronic device, thereby providing the purchaser with a more customized device directly out of the box.

Embodiments of the present invention may provide various advantages not provided by prior art systems. The packaging system may be capable of servicing a device that is sealed in customer packaging before the device is shipped to a retailer. For example, a manufacturer may service a sealed device before it is placed in storage. Furthermore, the placement of at least one lead on a sidewall that has a smaller area than a base may be advantageous for docking a package onto a dock.

While the invention has been described in terms of particular embodiments and illustrative figures, those of ordinary skill in the art will recognize that the invention is not limited to the embodiments or figures described. For example, in many of the embodiments described above, signals are transmitted to a device via electrically conductive connections. Alternatively, signals may be transmitted to a device through a package via other connections such as radio connections, infrared connections, fiber-optic connections, ultrasound connections, inductive connections, and other wireless technologies.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A packaging system, comprising:
    an electronic device comprising a servicing interface port for receiving one or more of power or data;
    a package containing the electronic device, the package comprising a base and a plurality of sidewalls, wherein each sidewall has a lower edge coupled to the base and an upper edge such that the upper edges of the plurality of sidewalls define an opening exposing the electronic device;
    an umbilical portion comprising a plurality of conductive contacts exposed on an outer surface of a first sidewall of the plurality of sidewalls and a connector configured to couple with a connection port of the electronic device, said connector being coupled to the plurality of conductive contacts; and
    a dock including a plurality of dock contacts, wherein each of the dock contacts is positioned to electrically couple with a corresponding one of the plurality of conductive contacts when the dock is positioned adjacent to and in contact with the plurality of conductive contacts of the umbilical portion.

2. The packaging system of claim 1, wherein the dock is coupled to a power source and is adapted to supply power to the electronic device via the dock contacts and the conductive contacts while the electronic device is disposed in the package.

3. The packaging system of claim 1, wherein the dock is coupled to a computing device and is configured to facilitate wired data communications between the computing device and the electronic device while the electronic device is disposed in the package.

4. A packaging system for an electronic device having a servicing interface, the packaging system comprising:
    a package configured to house the electronic device, the package comprising a base and a plurality of sidewalls, wherein each sidewall has a lower edge coupled to the base and an upper edge such that the upper edges of the plurality of sidewalls define an opening for exposing the electronic device; and
    an adapter comprising:
        a plurality of conductive contacts exposed on an outer surface of a first sidewall of the plurality of sidewalls; and
        a connector configured to couple with the servicing interface of the electronic device, said connector being coupled to the plurality of conductive contacts.

5. The packaging system of claim 4, wherein each of the plurality of conductive contacts comprises a contact surface substantially coplanar with the outer surface of the first sidewall.

6. The packaging system of claim 4, wherein:
    the plurality of conductive contacts are coupled to an inner surface of the first sidewall, extend over an upper edge of the first sidewall, and are coupled to an outer surface of the first sidewall.

7. The packaging system of claim 4, wherein said plurality of conductive contacts comprise conductive ink deposited on the first sidewall.

8. The packaging system of claim 4, wherein said plurality of contacts comprise conductive flexible films.

9. The packaging system of claim 4, wherein the connector comprises one or more of the following: a standard USB connector, a mini USB connector, or a micro USB connector.

10. The packaging system of claim 4, wherein the first sidewall comprises one or more openings exposing the plurality of conductive contacts.

11. The packaging system of claim 4, further comprising:
    a servicing dock comprising a plurality of dock contacts, wherein each of the dock contacts is positioned to electrically couple with a corresponding one of the conductive contacts when the servicing dock is positioned adjacent to and in contact with the connection region of the adapter.

12. The packaging system of claim 11, wherein said servicing dock is configured to enable at least one of the following operations on the electronic device: supply power to the electronic device, charge a battery of the electronic device and facilitate wired data communications with the electronic device.

13. The packaging system of claim 4, further comprising:
    a platform disposed in the package, wherein portions of the plurality of conductive contacts are disposed underneath the platform.

14. The packaging system of claim 4, wherein the adapter further comprises a circuit protection component configured to mitigate or prevent transmission of undesirable voltage or current levels to the electronic device.

15. The packaging system of claim 4, further comprising:
    a withdrawal guide configured to guide removal of the electronic device from the package in a predetermined direction opposite from the servicing interface.

16. The packaging system of claim 4, further comprising:
    a platform forming a cavity configured to hold a portion of the adapter.

17. The packaging system of claim 4, wherein:
    the connector comprises a rigid stiffening portion comprising a disposable material with conductive traces formed thereon.

18. The packaging system of claim 4, wherein the package further comprises a cover integrally formed with one of the sidewalls such that the upper edge of the sidewall integrally formed with the cover comprises a fold seam between the sidewall and the cover.

19. The packaging system of claim 4, further comprising a platform configured to support the electronic device, wherein the platform and the base of the package form a cavity in which at least a portion of the adapter is provided.

20. A method for interacting with an electronic device disposed inside a container comprising a base and a plurality of sidewalls, wherein each sidewall has a lower edge coupled to the base and an upper edge such that the upper edges of the plurality of sidewalls define an opening exposing the electronic device, the container including a plurality of electrical contacts provided on an exterior of a first sidewall of the plurality of sidewalls and wherein the plurality of electrical contacts are electrically coupled to a communication port of the electronic device via a flexible umbilical portion, the method comprising:
    upon coupling the plurality of electrical contacts to a servicing dock, receiving, by the electronic device via one or more of the plurality of electrical contacts, the servicing dock, and the communication port, a data signal or a power signal, while the electronic device remains disposed in the container.

21. The method of claim 20, further comprising performing, by the electronic device, an action based on the received data signal or the power signal.

22. The method of claim 20, wherein the receiving comprises receiving the data signal or the power signal from a device external to the container and coupled to the servicing dock, while the electronic device is still inside the container.

23. The method of claim 20, wherein each of the plurality of electrical contacts comprises a contact surface substantially coplanar with the outer surface of the one of the first sidewall.

24. The method of claim 20, further comprising supporting the electronic device with a platform, wherein the platform and the base of the container form a cavity in which at least a portion of the flexible umbilical portion is provided.

* * * * *